United States Patent
He et al.

(10) Patent No.: US 10,897,740 B1
(45) Date of Patent: Jan. 19, 2021

(54) METHODS AND DEVICES FOR FACILITATING PATH LOSS ESTIMATIONS FOR TRANSMIT POWER CONTROL

(71) Applicant: QUALCOMM Incorporated, San Diego, CA (US)

(72) Inventors: Ruhua He, San Diego, CA (US); Michael Levitsky, Rehovot (IL); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/590,102

(22) Filed: Oct. 1, 2019

(51) Int. Cl.
*H04W 24/08* (2009.01)
*H04W 52/24* (2009.01)
*H04W 56/00* (2009.01)

(52) U.S. Cl.
CPC ......... *H04W 52/242* (2013.01); *H04W 24/08* (2013.01); *H04W 56/0005* (2013.01)

(58) Field of Classification Search
CPC H04W 52/242; H04W 24/08; H04W 56/0005
USPC ........................................................ 455/522
See application file for complete search history.

(56) References Cited

U.S. PATENT DOCUMENTS

| | | | | |
|---|---|---|---|---|
| 10,469,310 B2 * | 11/2019 | Kwon | ................. | H04W 52/367 |
| 10,554,262 B2 * | 2/2020 | Wilson | ................. | H04B 7/0408 |
| 10,554,470 B2 * | 2/2020 | Wilson | ................. | H04W 52/346 |
| 10,560,901 B2 * | 2/2020 | Jung | ................. | H04W 72/1289 |
| 10,568,041 B2 * | 2/2020 | MolavianJazi | ..... | H04W 52/365 |
| 10,602,549 B2 * | 3/2020 | Tsai | ........................ | H04B 7/088 |
| 2018/0302889 A1 * | 10/2018 | Guo | ........................ | H04B 7/088 |
| 2019/0044792 A1 * | 2/2019 | Kwon | ................... | H04W 52/18 |
| 2019/0069322 A1 * | 2/2019 | Davydov | ............ | H04W 74/006 |
| 2019/0104500 A1 * | 4/2019 | Reial | ..................... | H04L 5/0091 |
| 2019/0159135 A1 * | 5/2019 | MolavianJazi | ..... | H04W 52/362 |
| 2019/0159136 A1 * | 5/2019 | MolavianJazi | ... | H04W 72/1284 |
| 2019/0230529 A1 * | 7/2019 | Sadiq | ....................... | H04B 7/04 |
| 2019/0238208 A1 * | 8/2019 | Tang | ..................... | H04W 24/10 |
| 2019/0254120 A1 * | 8/2019 | Zhang | ..................... | H04W 4/80 |
| 2019/0261280 A1 * | 8/2019 | Jung | .................. | H04W 52/386 |
| 2019/0261281 A1 * | 8/2019 | Jung | ..................... | H04W 52/50 |
| 2019/0274169 A1 * | 9/2019 | Tsai | ........................ | H04B 7/088 |
| 2019/0281588 A1 * | 9/2019 | Zhang | .................. | H04L 5/0051 |
| 2019/0327767 A1 * | 10/2019 | Islam | .................... | H04W 24/08 |
| 2019/0349798 A1 * | 11/2019 | Lin | ........................ | H04L 5/0048 |
| 2019/0364556 A1 * | 11/2019 | Davydov | ................ | H04L 5/005 |
| 2019/0373450 A1 * | 12/2019 | Zhou | .................. | H04W 74/0833 |
| 2019/0387479 A1 * | 12/2019 | Gong | .................. | H04W 52/242 |
| 2019/0393980 A1 * | 12/2019 | Lin | ....................... | A01K 63/065 |

(Continued)

*Primary Examiner* — Hai V Nguyen
(74) *Attorney, Agent, or Firm* — Qualcomm IP Dept.; James Hunt Yancey, Jr.

(57) ABSTRACT

Wireless communication devices are adapted to facilitate path loss estimations utilizing a synchronization signal block (SSB). According to one example, a wireless communication device can obtain a spatial relation reference signal. The wireless communication device may determine a SSB in quasi-colocation (QCL) with the received spatial relation reference signal. A path loss may be measured utilizing the determined SSB. The wireless communication device may conduct transmit power control based on the measured path loss associated with the determined SSB. Other aspects, embodiments, and features are also included.

16 Claims, 7 Drawing Sheets

(56) References Cited

U.S. PATENT DOCUMENTS

| | | | |
|---|---|---|---|
| 2019/0394749 A1* | 12/2019 | Islam | H04W 72/042 |
| 2020/0022010 A1* | 1/2020 | Kim | H04W 24/02 |
| 2020/0029316 A1* | 1/2020 | Zhou | H04W 74/0833 |
| 2020/0045745 A1* | 2/2020 | Cirik | H04W 76/27 |
| 2020/0052837 A1* | 2/2020 | Zhang | H04B 7/0626 |
| 2020/0053580 A1* | 2/2020 | Bagheri | H04W 72/042 |
| 2020/0053712 A1* | 2/2020 | Josan | H04W 76/00 |
| 2020/0053738 A1* | 2/2020 | Harada | H04B 7/0626 |
| 2020/0053757 A1* | 2/2020 | Bagheri | H04L 5/0035 |
| 2020/0065596 A1* | 2/2020 | Maeng | H04W 72/042 |
| 2020/0068497 A1* | 2/2020 | Gong | H04W 52/146 |
| 2020/0092814 A1* | 3/2020 | Zhou | H04L 5/00 |
| 2020/0100154 A1* | 3/2020 | Cirik | H04W 36/06 |
| 2020/0119821 A1* | 4/2020 | Qin | H04L 5/0048 |
| 2020/0137741 A1* | 4/2020 | Zhou | H04W 80/02 |
| 2020/0280409 A1* | 9/2020 | Grant | H04B 7/0697 |

* cited by examiner

METHODS AND DEVICES FOR FACILITATING PATH LOSS ESTIMATIONS FOR TRANSMIT POWER CONTROL

TECHNICAL FIELD

The technology discussed below relates generally to wireless communication systems, and more particularly, to methods and devices that facilitate path loss estimations utilizing a synchronization signal block (SSB) for transmit power control.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the Third Generation Partnership Project (3GPP) is an organization that develops and maintains telecommunication standards for fourth generation (4G) long-term evolution (LTE) networks and fifth generation (5G) new radio (NR) networks. 5G NR networks may exhibit a higher degree of flexibility and scalability than LTE, and are envisioned to support very diverse sets of requirements. Techniques applicable in such networks for ensuring reliable communications between devices may be desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations facilitate measuring path loss utilizing a synchronization signal block (SSB) and utilizing such measurements for transmit power control. According to at least one example, a wireless communication device is disclosed. In at least one example, a wireless communication device may include a transceiver and a processor coupled to the transceiver. The processor may be adapted to receive a spatial relation reference signal. The processor may further be adapted to determine an SSB in quasi-colocation (QCL) with the received spatial relation reference signal, and measure a path loss associated with the determined SSB. The processor may also be adapted to conduct transmit power control based on the measured path loss associated with the determined SSB, and send a transmission according to the transmit power control.

Additional aspects of the present disclosure include methods operational on a wireless communication device and/or means for performing such methods. According to at least one example, such methods may include receiving a spatial relation reference signal, and determining a SSB quasi-colocated with the received spatial relation reference signal. A path loss associated with the determined SSB may be estimated, and a transmit power may be determined based on the measured path loss. A transmission may be sent utilizing the determined transmit power.

Still further aspects of the present disclosure include a processor-readable storage medium storing processor-executable instructions. In at least one example, the processor-executable instructions may be adapted to cause a processor to obtain a spatial relation reference signal and determine a SSB quasi-colocated with the received spatial relation reference signal. The processor-executable instructions may be further adapted to cause a processor to estimate path loss associated with the determined SSB. The processor-executable instructions may be further adapted to cause a processor to conduct transmit power control based on the estimated path loss associated with the determined SSB.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
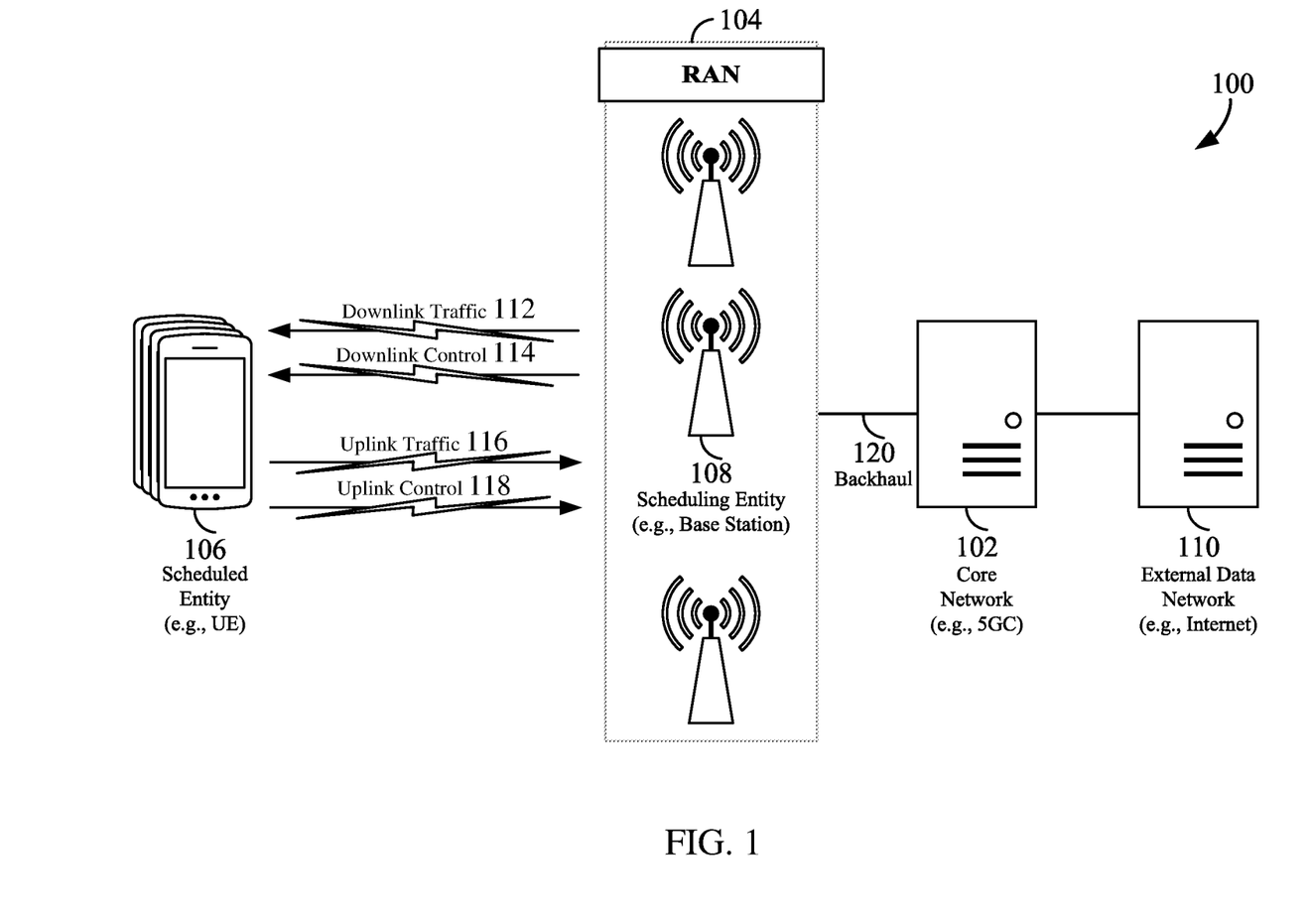
FIG. 1 is a schematic diagram illustrating an example of a wireless communication system according to some embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
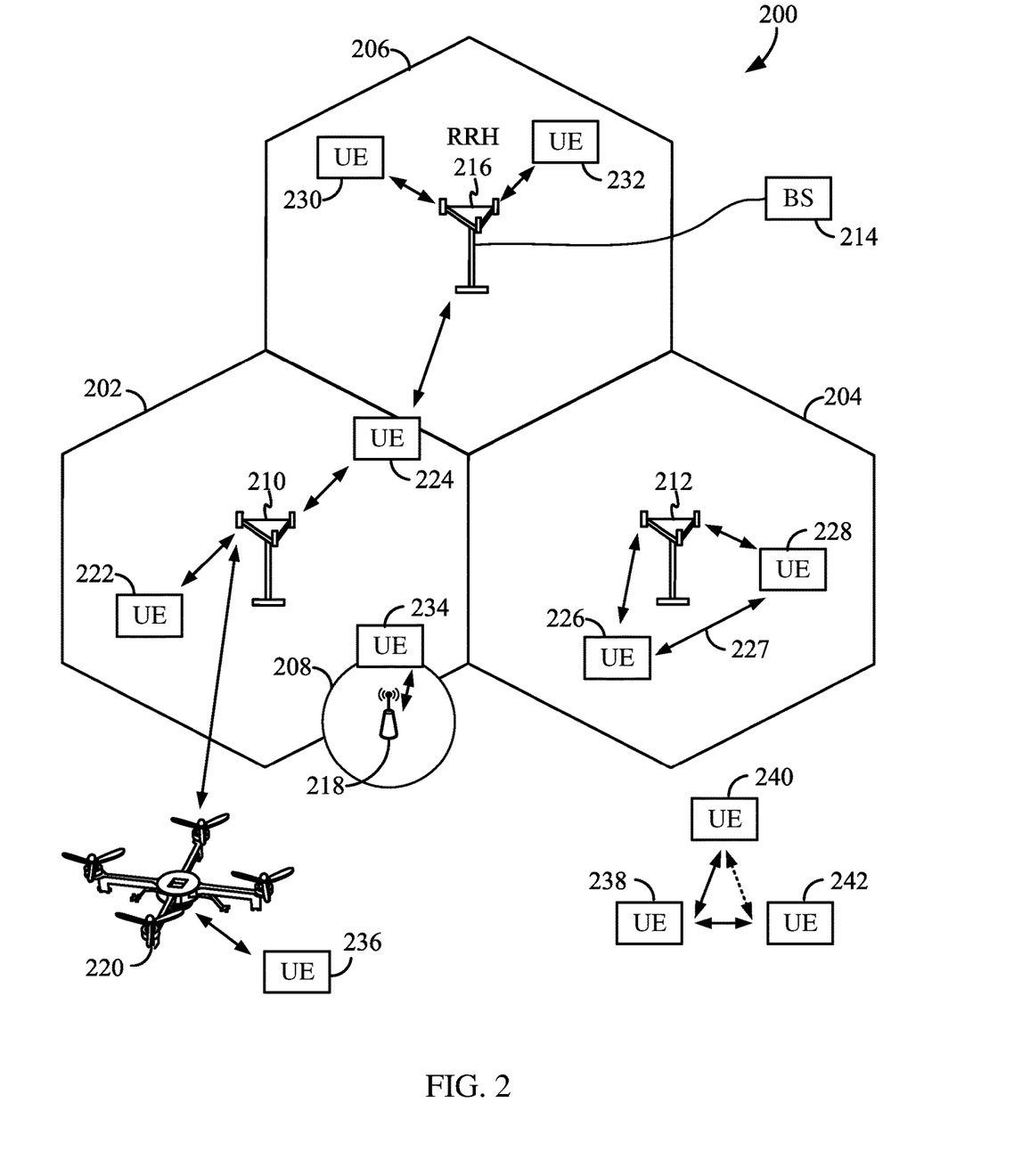
FIG. 2 is a conceptual diagram illustrating an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

Figure 3:
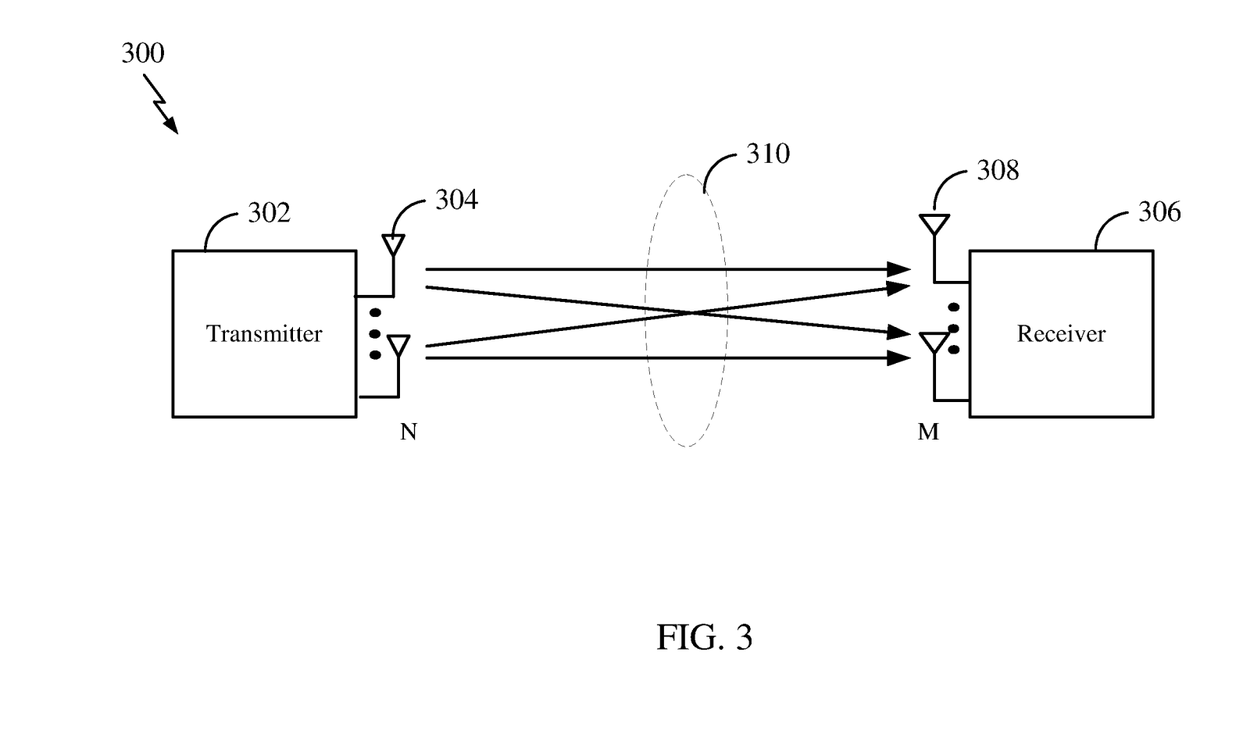
FIG. 3 is a block diagram illustrating an example of a wireless communication system supporting multiple-input multiple-output (MIMO) communication according to some embodiments.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In some implementations, a scheduled entity may utilize various reference signals for uplink communications. For example, a scheduled entity may utilize a spatial relation reference signal (RS) to indicate quasi-colocation (QCL) relationships for uplink channels. Generally, a spatial relation RS is a reference signal that indicates QCL relationships for uplink channels. The scheduled entity may accordingly utilize the spatial relation RS to indicate the uplink beam to be utilized. Further, a scheduled entity may utilize a pathloss RS to conduct uplink power control of respective uplink channels. Generally, a pathloss RS is a downlink reference signal that enables the scheduled entity to estimate the pathloss. A scheduled entity may accordingly utilize the received pathloss RS to estimate a path loss for uplink transmit power determination in order to satisfy the received signal to interference and noise ratio (SINR) at scheduling entity side without UE power waste.

The pathloss RS and the spatial relation RS may be defined in various manners. According to some aspects, these reference signals can be defined separately for one or more channels (e.g., for each of the uplink channels, such as SRS, PUCCH, PUSCH). Additionally, the pathloss RS and spatial relation RS are typically updated through separate signaling. As a result, the pathloss RS may not be in sync with the spatial relation RS. That is, the pathloss RS and spatial relation RS may not be in sync for the same signal path. For example, the spatial relation RS may update separate from the pathloss RS. As a result, the scheduled entity may estimate path loss based on the pathloss RS that is not current with the spatial relation RS. In other words, the scheduled entity may estimate path loss for the wrong path, as the spatial relation RS would indicate an updated signal path. In such an example, an incorrect path loss estimation may result in an uplink transmit power determination that is also incorrect. Such a result may be especially problematic for open loop uplink power, where the pathloss RS may be the only source for estimating the power needs for uplink transmissions.

According to one or more aspects of the present disclosure, wireless communication devices are configured to perform path loss estimations. This can be done, for example, utilizing a synchronization signal block (SSB) that is in quasi-colocation (QCL) with the source of the spatial relation RS. The SSB is a conventional transmission that may include a primary synchronization signal (PSS), a secondary synchronization signal (SSS), and/or a physical broadcast channel (PBCH). By utilizing the SSB that is quasi-colocated (QCL'ed) with the spatial relation RS to estimate path loss for UL transmit power determinations, a wireless communication device can ensure that the path loss estimations are current with any spatial relation RS updates. Ensuring the path loss estimations are correct for the current beam(s) can ensure that uplink power control is accurate.

Figure 4:
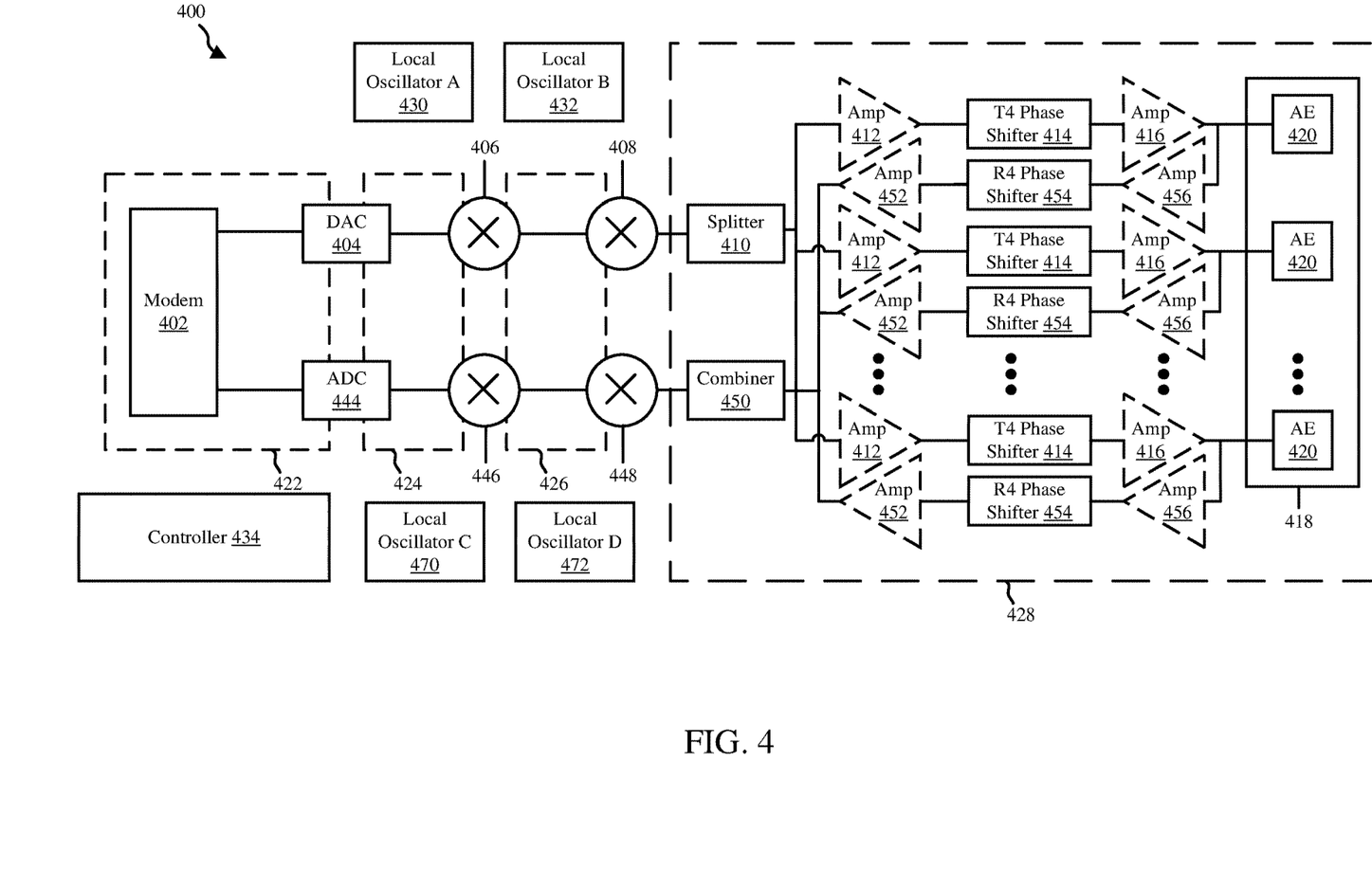
FIG. 4 is a block diagram illustrating an example of an architecture that supports transmission and/or reception of DFT based beams according to some embodiments.

A QCL relationship may include a situation where properties of a channel over which a symbol on one antenna port is conveyed can be inferred from a channel over which a symbol on another antenna port is conveyed. For example, if signal A is QCL'ed to signal B, then signal A has gone through the similar channel condition as signal B. The channel information estimated to detect signal A can also help detect signal B. Numerous factors can define the channel condition. Current 3GPP descriptions of such channel condition can include Doppler shift, Doppler spread, average delay, delay spread, and/or spatial Rx parameter. One or more of these factors can form a property of the channel that two signals share. Currently, predefined groups of these factors are labeled as QCL types. For example, Type-A includes Doppler shift, Doppler spread, average delay, and delay spread. Type-B includes Doppler shift and Doppler spread. Type-C includes average delay and Doppler shift. Type-D includes spatial Rx parameter. By way of an example, signal A is QCL'ed with signal B by type-C when signal A and signal B are transmitted on a similar radio channel that shares similar properties in terms of average delay and Doppler shift, FIG. 4 illustrates an example of an architecture 400 that supports beamformed communications in a mmW channel in accordance with aspects of the present disclosure. In some aspects, diagram 400 may be an example of the transmitting device and/or a receiving device as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here.

As shown, FIG. 4 illustrates a variety of components. For example, the architecture 400 includes a modem (modulator/demodulator) 402, a digital to analog converter (DAC) 404, a first mixer 406, a second mixer 408, and a splitter 410. The architecture 400 also includes a plurality of first amplifiers 412, a plurality of phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital baseband signals travel or are processed, box 424 indicates a region in which analog baseband signals travel or are processed, box 426 indicates a region in which analog intermediate frequency (IF) signals travel or are processed, and box 428 indicates a region in which analog radio frequency (RF) signals travel or are processed. The architecture also includes a local oscillator A 430, a local oscillator B 432, and a controller 434.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the controller 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some implementations. In one implementation, both the first amplifier 412 and second amplifier 414 are present. In another, neither the first amplifier 412 nor the second amplifier 414 is present. In other implementations, one of the two amplifiers 412, 414 is present but not the other. By way of example, if the splitter 410 is an active splitter, the first amplifier 412 may not be used. By way of further example, if the phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or controller 434) to provide independent control of the gain for each antenna element 420. For example, the modem 402 and/or the controller 434 may have at least one control line connected to each of the splitter 410, first amplifiers 412, phase shifters 414, and/or second amplifiers 416 which may be used to configure a gain to provide a desired amount of gain for each component and thus each antenna element 420.

The phase shifter 414 may provide a configurable phase shift or phase offset to a corresponding RF signal to be transmitted. The phase shifter 414 could be a passive phase shifter not directly connected to a power supply. Passive phase shifters might introduce some insertion loss. The second amplifier 416 could boost the signal to compensate for the insertion loss. The phase shifter 414 could be an active phase shifter connected to a power supply such that the active phase shifter provides some amount of gain or prevents insertion loss. The settings of each of the phase shifters 414 are independent meaning that each can be set to provide a desired amount of phase shift or the same amount of phase shift or some other configuration. The modem 402 and/or the controller 434 may have at least one control line connected to each of the phase shifters 414 and which may be used to configure the phase shifters 414 to provide a desired amounts of phase shift or phase offset between antenna elements 420.

In the illustrated architecture 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more of phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the controller 434 may have at least one control line connected to each of the phase shifters 454 and which may be used to configure the phase sifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated architecture 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, e.g., decoding, de-interleaving, etc.

The architecture 400 is given by way of example only to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 422, 424, 426, 428) in different implemented architectures. For example, a split of the signal to be transmitted into a plurality of signals may take place at the analog RF, analog IF, analog baseband, or digital baseband frequencies in different examples.

Similarly, amplification, and/or phase shifts may also take place at different frequencies. For example, in some contemplated implementations, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or second amplifiers 412, 416. By way of another example, a phase shift may be implemented by the second mixer 408 to obviate the need for a separate phase shifter 414. This technique is sometimes called local oscillator (LO) phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the controller 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416.

Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the plurality of signals relative to each other.

Figure 5:
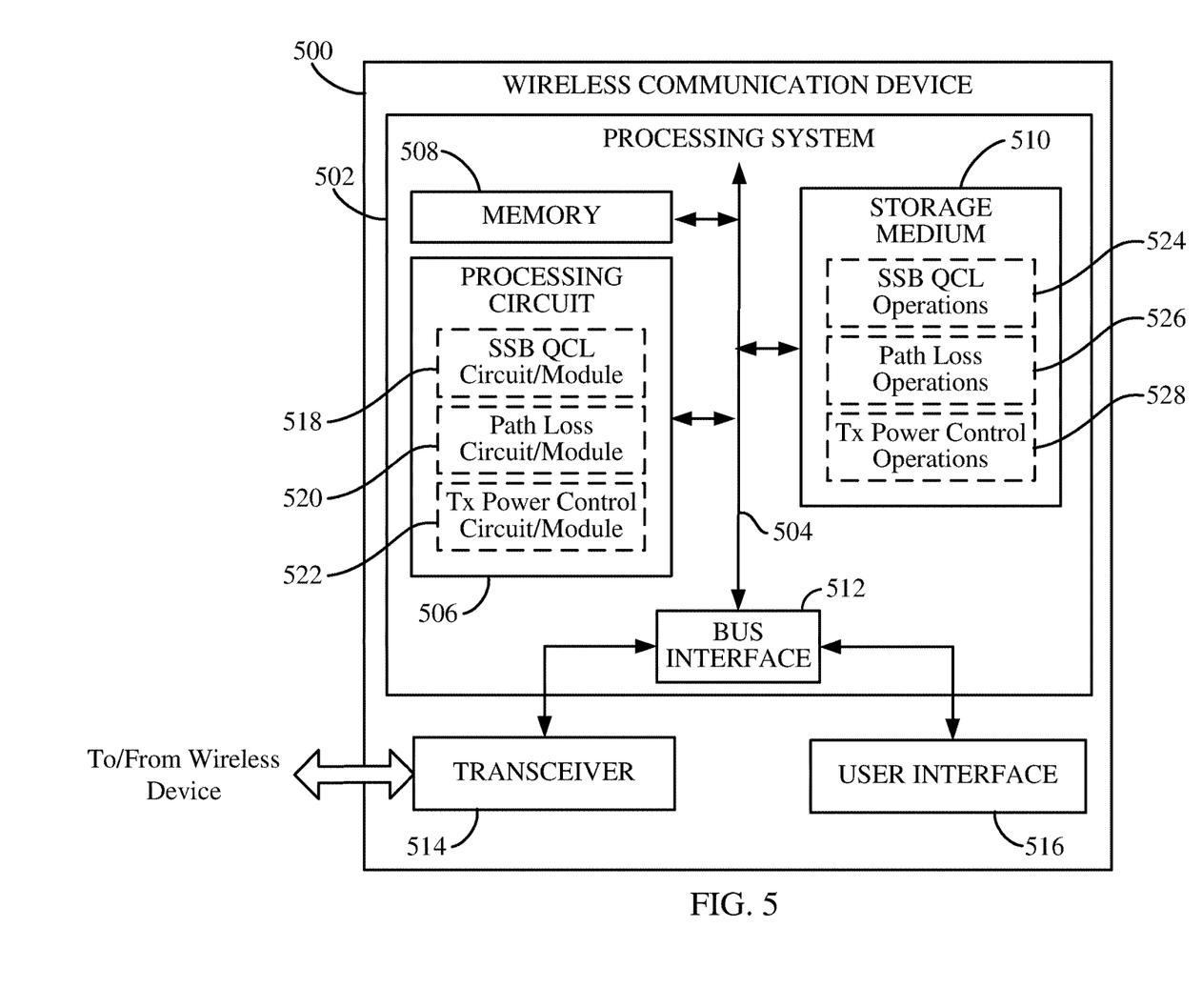
FIG. 5 is a block diagram illustrating various components of a wireless communication device employing a processing system according to some embodiments.

FIG. 5 is a block diagram illustrating various components of a wireless communication device 500 employing a processing system 502 according to at least one example of the present disclosure. In some instances, the modem 402 and/or the controller 434 described above with reference to FIG. 4 may be implemented by, and/or located partially or fully within the processing system 602 (e.g., processing circuit 606, storage medium 610).

In the depicted example, the processing system 502 is implemented with a bus architecture, represented generally by the bus 504. The bus 504 may include any number of interconnecting buses and bridges depending on the specific application of the processing system 502 and the overall design constraints. The bus 504 communicatively couples together various circuits including one or more processors (represented generally by the processing circuit 506), a memory 508, and computer-readable media (represented generally by the storage medium 510). The bus 504 may also link various other circuits such as timing sources, peripherals, voltage regulators, and power management circuits, which are well known in the art, and therefore, will not be described any further. A bus interface 512 provides an interface between the bus 504 and a transceiver 514. The transceiver 514 provides a means for communicating with various other apparatus over a transmission medium. In some instances, various components in FIG. 4 (e.g., in boxes 424, 426, 428, and/or local oscillators 430, 432, 470, 472) may be implemented by, and/or located partially or fully within the transceiver 514. Depending upon the nature of the apparatus, a user interface 516 (e.g., keypad, display, speaker, microphone, joystick) may also be provided.

The processing circuit 506 is responsible for managing the bus 504 and general processing, including the execution of programming stored on the computer-readable storage medium 510. The programming, when executed by the processing circuit 506, causes the processing system 502 to perform the various functions described below for any particular apparatus. The computer-readable storage medium 510 and the memory 508 may also be used for storing data that is manipulated by the processing circuit 506 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 506 is arranged to obtain, process and/or send data, control data access and storage, issue commands, and control other desired operations. The processing circuit 506 may include circuitry adapted to implement desired programming provided by appropriate media, and/or circuitry adapted to perform one or more functions described in this disclosure. For example, the processing circuit 506 may be implemented as one or more processors, one or more controllers, and/or other structure configured to execute executable programming and/or execute specific functions. Examples of the processing circuit 506 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 506 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 506 are for illustration and other suitable configurations within the scope of the present disclosure are also contemplated.

In some instances, the processing circuit 506 may include an SSB QCL circuit and/or module 518, a path loss circuit and/or module 520, and a transmit (Tx) power control circuit and/or module 522. The SSB QCL circuit/module 518 may generally include circuitry and/or programming (e.g., programming stored on the storage medium 510) adapted to receive a spatial relation reference signal. Upon receiving the spatial relation reference signal, the processing circuit 506 can process and analyze the signal to output one or more determinations. For example, the processing circuit can determine a synchronization signal block (SSB) QCL'ed with the received spatial relation reference signal.

The path loss circuit/module 520 may generally include circuitry and/or programming (e.g., programming stored on the storage medium 510) adapted to measure path loss associated with the determined SSB. The transmit power control circuit/module 522 may generally include circuitry and/or programming (e.g., programming stored on the storage medium 510) adapted to conduct transmit power control based on the measured path loss associated with the determined SSB. For example, the transmit power control circuit/module 522 may generally include circuitry and/or programming adapted to determine a transmit power based on the measured path loss, and send a transmission utilizing the determined transmit power. As used herein, reference to circuitry and/or programming may be generally referred to as logic (e.g., logic gates and/or data structure logic).

The storage medium 510 may represent one or more computer-readable devices for storing programming, such as processor executable code or instructions (e.g., software, firmware), electronic data, databases, or other digital information. The storage medium 510 may also be used for storing data that is manipulated by the processing circuit 506 when executing programming. The storage medium 510 may be any available non-transitory media that can be accessed by a general purpose or special purpose processor, including portable or fixed storage devices, optical storage devices, and various other mediums capable of storing, containing and/or carrying programming By way of example and not limitation, the storage medium 510 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 510 may be coupled to the processing circuit 506 such that the processing circuit 506 can read information from, and write information to, the storage medium 510. That is, the storage medium 510 can be coupled to the processing circuit 506 so that the storage medium 510 is at least accessible by the processing circuit 506, including examples where the storage medium 510 is integral to the processing circuit 506 and/or examples where the storage medium 510 is separate from the processing circuit 506 (e.g., resident in the processing system 502, external to the processing system 502, distributed across multiple entities).

Programming stored by the storage medium 510, when executed by the processing circuit 506, can cause the processing circuit 506 to perform one or more of the various functions and/or process steps described herein. In at least some examples, the storage medium 510 may include SSB QCL operations 524, path loss operations 526, and/or transmit power control operations 528. The SSB QCL operations 524 are generally adapted to cause the processing circuit 506 to receive a spatial relation reference signal and determine a SSB QCL'ed with the received spatial relation reference signal, as described herein. The path loss operations 526 are generally adapted to cause the processing circuit 506 to measure path loss associated with the determined SSB, as described herein. The transmit power control operations 528 are generally adapted to cause the processing circuit 506 to conduct transmit power control based on the measured path loss associated with the determined SSB, as described herein.

Thus, according to one or more aspects of the present disclosure, the processing circuit 506 is adapted to perform (independently or in conjunction with the storage medium 510) any or all of the processes, functions, steps and/or routines for any or all of the wireless communication devices described herein (e.g., scheduled entity 106, UE 222, 224, 226, 228, 230, 232, 234, 236, 238, 240, and 242, transmitter 302, receiver 306, architecture 400). As used herein, the term "adapted" in relation to the processing circuit 506 may refer to the processing circuit 506 being one or more of configured, employed, implemented, and/or programmed (in conjunction with the storage medium 510) to perform a particular process, function, step and/or routine according to various features described herein.

Figure 6:
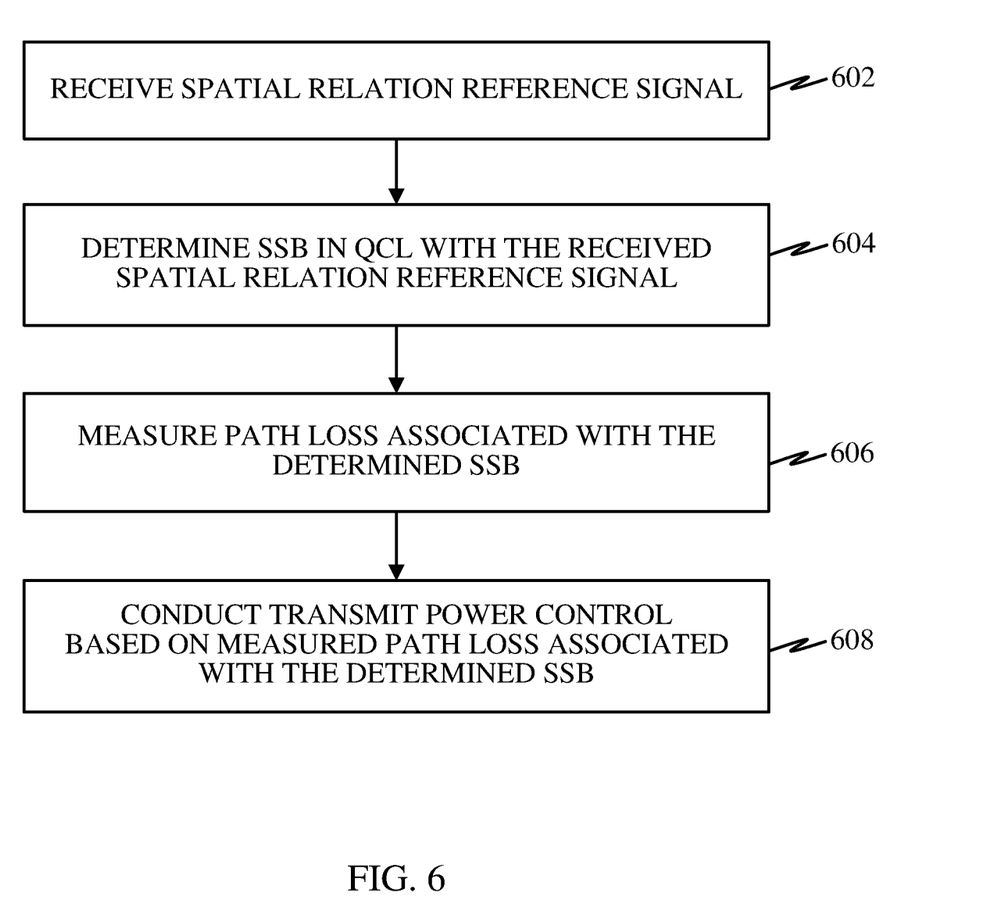
FIG. 6 is a flow diagram illustrating a wireless communication method (e.g., operational on or via a wireless communication device) according to some embodiments.

FIG. 6 is a flow diagram illustrating a wireless communication method (e.g., operational on or via a wireless communication device) according to at least one example. With reference to FIGS. 5 and 6, a wireless communication device 500 may obtain a spatial relation reference signal at step 602. For example, the processing system 502 may include logic (e.g., processing circuit 506, SSB QCL circuit/module 518, SSB QCL operations 524) to receive a spatial relation reference signal via the transceiver 514.

At 604, the wireless communication device 600 may determine a SSB QCL'ed with the received spatial relation reference signal. For example, the processing system 502 may include logic (e.g., processing circuit 506, SSB QCL circuit/module 518, SSB QCL operations 524) to identify a SSB that is in QCL with the received spatial relation reference signal. For instance, the SSB that is QCL'ed with the spatial relation reference signal may be identified by utilizing multi-hop QCL tracing from the spatial relation reference signal to the SSB. Tracing generally refers to determining a path from a received signal to the origination point of that particular signal. Such QCL tracing can facilitate identification of a signal QCL'ed with the received signal.

Figure 7:
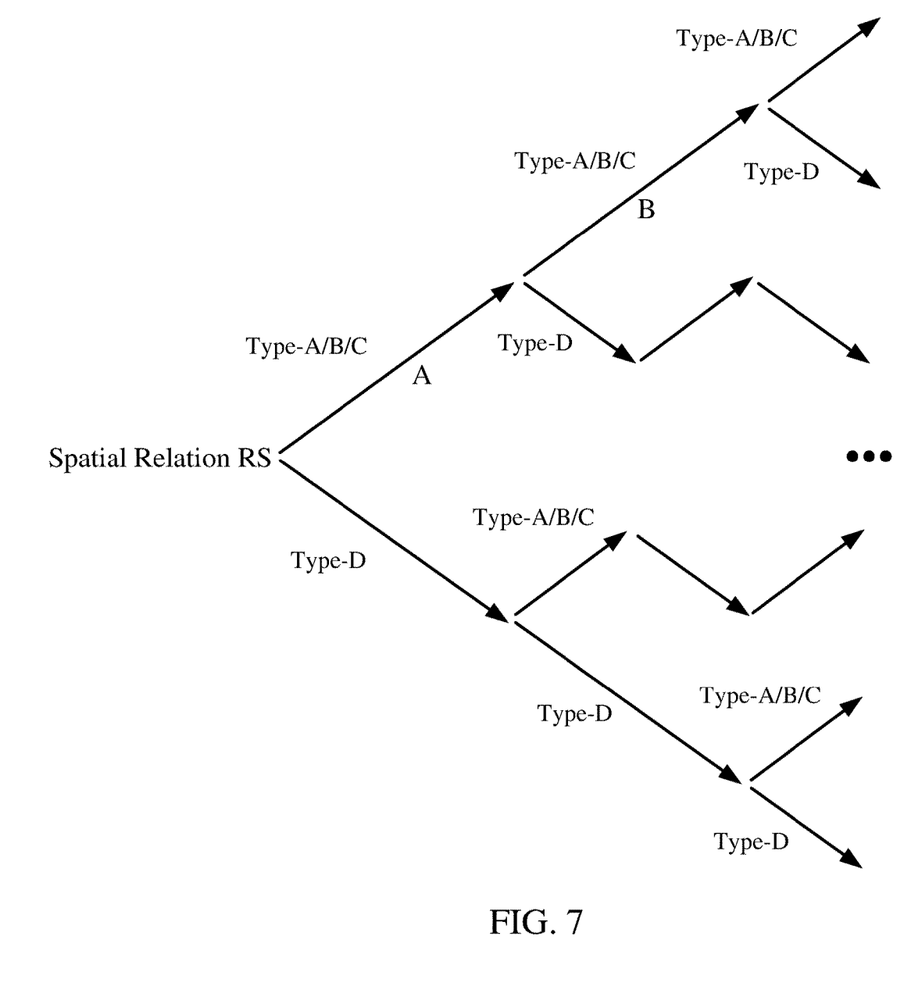
FIG. 7 is a diagram generally depicting an example of multi-hop QCL tracing according to some embodiments.

In at least one example, the processing system 502 may include logic (e.g., processing circuit 506, SSB QCL circuit/module 518, SSB QCL operations 524) to utilize multi-hop QCL tracing from the spatial relation reference signal to the SSB. FIG. 7 is a diagram generally depicting an example of multi-hop QCL tracing according to at least one embodiment. As shown, the tracing begins with the spatial relation reference signal for a particular wireless transmission channel. The wireless communication device 600 may identify a source for the spatial relation reference signal, denoted in FIG. 7 by arrow A. The wireless communication device 600 can then determine a source of A, denoted in FIG. 7 by arrow B. At the end of each arrow, the wireless communication device 600 can determine a source for that point, until an origination point for the spatial relation reference signal. Once a path is identified in FIG. 7, the wireless communication device 600 can identify the SSB associated with that path. The identified SSB may be determined to be the SSB that is QCL'ed with the spatial relation reference signal.

Determinations of paths may occur in a variety of manners. In the example just described, the wireless communication device 600 utilized a type-A/B/C chain rule. Generally, based on this rule, the wireless communication device 600 selects the type-A/B/C path at each branch. In other examples, the wireless communication device 600 may select a type-D chain rule, whereby the wireless communication device 600 may select the type-D path at each branch. In still other examples, the wireless communication device 600 may select a hybrid chain rule, whereby the wireless communication device 600 may select either the type-A/B/C path or the type-D path at any given branch.

Referring again to FIG. 6, with the SSB in QCL with the spatial relation reference signal determined in step 604, the wireless communication device 600 can measure path loss associated with the determined SSB. In some scenarios, path loss measurements can be based on analyzing reference signal receive characteristics relative to known a priori data. For example, the processing system 502 may include logic (e.g., processing circuit 506, path loss circuit/module 520, path loss operations 526) to estimate the path loss associated with the beam on which the SSB was transmitted. Path loss measurements may be utilized in variety of manners to improve communications. In some embodiments, the path loss may be calculated by conventional formulas, such as the following:

$$PL = P_{Tx} - RSRP$$

where $P_{Tx}$ is a transmit power of a reference signal which is signaled from a transmitting device to a receiving device, and RSRP is the received power measured by the receiving device.

At 608, the wireless communication device 600 may conduct transmit power control based on a measured path loss. In some scenarios, measured path loss can be associated with the SSB determined to be in QCL with the spatial relation reference signal. For example, the processing system 502 may include logic (e.g., processing circuit 506, path loss circuit/module 520, path loss operations 526) to conduct transmit power control based at least in part on the measured path loss for the SSB. According to at least one implementation, the transmit power control may include determining a transmit power based on the measured path loss, and sending a transmission via the transceiver 514 utilizing the determined transmit power. According to some embodiments, the transmit power control may include conventional determinations for uplink power control including an open-loop component and a closed-loop component. The open-loop component may be based at least in part on the measured path loss associated with the SSB in QCL with the spatial relation reference signal.

The process shown in FIG. 6 may include additional aspects, such as any single aspect or any combination of aspects described below and/or in connection with one or more other processes described elsewhere herein.

In a first aspect, a wireless communication device may determine a transmit power based on the measured path loss, and send a transmission via the transceiver utilizing the determined transmit power.

In a second aspect, alone or in combination with the first aspect, a wireless communication device may conduct transmit power control based on a measured path loss associated with a determined SSB.

In a third aspect, alone or in combination with one or more of the first and second aspects, a wireless communication device may determine a SSB quasi-colocated with the received spatial relation reference signal utilizing multi-hop quasi-colocation (QCL) tracing from the spatial relation reference signal to the SSB.

In a fourth aspect, alone or in combination with one or more of the first through third aspects a wireless communication device may utilize multi-hop QCL tracing from the spatial relation reference signal to the SSB by utilizing one of a type-A/B/C chain rule, a type-D chain rule, or a hybrid chain rule for tracing from the spatial relation reference signal to the SSB.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 3, 4 and/or 5 may be configured to perform or employ one or more of the methods, features, parameters, and/or steps described herein with reference to FIGS. 6 and/or 7. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
a transceiver;
a memory; and
a processor communicatively coupled to the transceiver and the memory, the processor configured to:
receive, via the transceiver, a spatial relation reference signal;
determine a synchronization signal burst (SSB) quasi-colocated with the received spatial relation reference signal by utilizing multi-hop quasi-colocation (QCL) tracing from the spatial relation reference signal to the SSB; and
measure path loss associated with the determined SSB.

2. The wireless communication device of claim 1, wherein the processor is further configured to:
determine a transmit power based on the measured path loss; and
send a transmission via the transceiver utilizing the determined transmit power.

3. The wireless communication device of claim 1, wherein the processor is further configured to:
conduct transmit power control based on the measured path loss associated with the determined SSB.

4. The wireless communication device of claim 1, wherein the processor configured to utilize multi-hop QCL tracing from the spatial relation reference signal to the SSB comprises the processor configured to:
utilize one of a type-A/B/C chain rule, a type-D chain rule, or a hybrid chain rule for tracing from the spatial relation reference signal to the SSB.

5. A method of wireless communication, comprising:
receiving a spatial relation reference signal;
determining a synchronization signal burst (SSB) quasi-colocated with the received spatial relation reference signal by utilizing multi-hop quasi-colocation (QCL) tracing from the spatial relation reference signal to the SSB; and
measuring path loss associated with the determined SSB.

6. The method of claim 5, further comprising:
determining a transmit power based on the measured path loss; and
sending a transmission utilizing the determined transmit power.

7. The method of claim 5, further comprising:
conducting transmit power control based on the measured path loss associated with the determined SSB.

8. The method of claim 4, wherein utilizing multi-hop QCL tracing from the spatial relation reference signal to the SSB comprises:
utilizing one of a type-A/B/C chain rule, a type-D chain rule, or a hybrid chain rule for tracing from the spatial relation reference signal to the SSB.

9. An apparatus for wireless communication, comprising:
means for receiving a spatial relation reference signal;
means for determining a synchronization signal burst (SSB) quasi-colocated with the received spatial relation reference signal by utilizing multi-hop quasi-colocation (QCL) tracing from the spatial relation reference signal to the SSB; and
means for measuring path loss associated with the determined SSB.

10. The apparatus of claim 9, further comprising:
means for determining a transmit power based on the measured path loss; and
means for sending a transmission utilizing the determined transmit power.

11. The apparatus of claim 9, further comprising:
means for conducting transmit power control based on the measured path loss associated with the determined SSB.

12. The apparatus of claim 9, wherein the means for utilizing multi-hop quasi-colocation (QCL) tracing from the spatial relation reference signal to the SSB comprises:
means for utilizing one of a type-A/B/C chain rule, a type-D chain rule, or a hybrid chain rule for tracing from the spatial relation reference signal to the SSB.

13. A non-transitory processor-readable storage medium storing processor-executable programming for causing a processing circuit to:
obtain a spatial relation reference signal;
determine a synchronization signal burst (SSB) quasi-colocated with the received spatial relation reference signal by utilizing multi-hop quasi-colocation (QCL) tracing from the spatial relation reference signal to the SSB; and
estimate path loss associated with the determined SSB.

14. The processor-readable storage medium of claim 13, further comprising processor-executable programming for causing a processing circuit to:
determine a transmit power based on the estimated path loss; and
send a transmission via the transceiver utilizing the determined transmit power.

15. The processor-readable storage medium of claim 13, further comprising processor-executable programming for causing a processing circuit to:
conduct transmit power control based on the estimated path loss associated with the determined SSB.

16. The processor-readable storage medium of claim 13, wherein the processor-executable programming for causing a processing circuit to utilize multi-hop QCL tracing from the spatial relation reference signal to the SSB comprises processor-executable programming for causing a processing circuit to:
utilize one of a type-A/B/C chain rule, a type-D chain rule, or a hybrid chain rule for tracing from the spatial relation reference signal to the SSB.

* * * * *